United States Patent
Lin (10) Patent No.: US 9,168,560 B2
(45) Date of Patent: Oct. 27, 2015

(54) FEEDING MOLD

(71) Applicant: Min-Hsiung Lin, Taipei (TW)

(72) Inventor: Min-Hsiung Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 418 days.

(21) Appl. No.: 13/711,633

(22) Filed: Dec. 12, 2012

(65) Prior Publication Data

US 2014/0083356 A1 Mar. 27, 2014

(30) Foreign Application Priority Data

Sep. 21, 2012 (TW) ............................... 101134841 A (51) Int. Cl.
| | | |
|---|---|---|
| *B29C 45/27* | (2006.01) | |
| *B05C 11/10* | (2006.01) | |
| *B29C 45/14* | (2006.01) | |
| *B29C 37/00* | (2006.01) | |

(52) U.S. Cl.
CPC ....... *B05C 11/1047* (2013.01); *B29C 45/14688* (2013.01); *B29C 45/27* (2013.01); *B29C 45/2701* (2013.01); *B29C 45/2703* (2013.01); *B29C 45/2704* (2013.01); *B29C 45/2708* (2013.01); *B29C 2037/0035* (2013.01)

(58) Field of Classification Search
CPC  B29C 45/27; B29C 45/2701; B29C 45/2703; B29C 45/2704; B29C 45/2708
USPC ................................................. 425/572, 542
See application file for complete search history.

(56) References Cited

U.S. PATENT DOCUMENTS

| | | | | |
|---|---|---|---|---|
| 2,279,380 A | * | 4/1942 | Reid | 249/107 |
| 2,730,182 A | * | 1/1956 | Sloane | 180/6.44 |
| 4,909,725 A | * | 3/1990 | Ward | 425/562 |
| 5,932,160 A | * | 8/1999 | Lee | 264/219 |

FOREIGN PATENT DOCUMENTS

| | | |
|---|---|---|
| CN | 101722631 | 6/2010 |
| TW | M320482 | 10/2007 |

OTHER PUBLICATIONS

"Office Action of Taiwan Counterpart Application," issued on Mar. 26, 2015, p. 1-p. 4, in which the listed reference was cited.

* cited by examiner

*Primary Examiner* — Tim Heitbrink
(74) *Attorney, Agent, or Firm* — Jianq Chyun IP Office (57) ABSTRACT

A feeding mold including a runner and a gate structure is provided. The runner is adapted to be filled with a liquid-like material. The gate structure includes a storage cavity, a running passage and a filling cavity. The storage cavity communicates with the runner and is adapted to store the liquid-like material filled by the runner. The running passage communicates with the storage cavity. The running passage is adapted to carry the liquid-like material from the storage cavity so as to evenly distribute the liquid-like material. The running passage has a protruding buffering cavity which is located between the storage cavity and the filling cavity and is adapted to change the velocity of the liquid-like material in the running passage, and lower the temperature of the liquid-like material flowed onto a surface of a workpiece.

13 Claims, 14 Drawing Sheets

FEEDING MOLD

CROSS-REFERENCE TO RELATED APPLICATION

This application claims the priority benefit of Taiwan application serial no. 101134841, filed on Sep. 21, 2012. The entirety of the above-mentioned patent application is hereby incorporated by reference herein and made a part of this specification.

BACKGROUND OF THE INVENTION

1. Field of the Invention

The invention relates to a mold, and in particular, to a feeding mold adapted for an in-mold roller (IMR).

2. Description of Related Art

Currently, many electronic devices, such as notebook computers, tablet PCs, or mobile phones, will add patterns or colors on the surface of a casing, so as to beautify the electronic device. Currently, methods of forming patterns or colors onto a surface of a casing includes methods such as spraying or printing. However, the surface treatment technology of spraying is complicated, and creates pollution. In addition, printing is limited to the chemical properties of the material, and is unable to create better external appearances.

In order to form a better pattern on a casing, a popular method is using an IMR. First, a film including a decorative pattern is disposed in a mold for injection molding. Next, resin is melted and filled in a side of the film, so that the melted resin is combined with the film to form a decorative film. Finally, the decorative film is extracted from the mold. Herein, the IMR process is complete.

However, as the thicknesses of casings gradually become thinner, in order to increase the strength and rigidity of casings, glass fibers are added into the plastic material. However, plastic material containing high glass fiber must be maintained under high temperature with good fluidity, so as to achieve a high gloss of the surface when injection molding. In addition, plastic material containing high glass fiber does not have the effects of bonding wires or floating fibers. Therefore, the injection molding requirements are strict (e.g. high injection speed), and so defects in the external appearance are easily created after the decorative film is combined with the casing.

SUMMARY OF THE INVENTION

The invention provides a feeding mold that can slow down the speed when injecting liquid-like material and lower the temperature of the liquid-like material flowing onto a surface of the workpiece. This allows the workpiece to have a better appearance.

The invention provides a feeding module including a runner and a gate structure. The runner is adapted to be filled with a liquid-like material. The gate structure includes a storage cavity, a running passage, and a filling cavity. The storage cavity communicates with the runner and is adapted to store the liquid-like material filled by the runner. The running passage communicates with the storage cavity, and is adapted to carry the liquid-like material from the storage cavity so as to evenly distribute the liquid-like material. The running passage has a protruding buffering cavity located between the storage cavity and the filling cavity. The buffering cavity is adapted to change the velocity distribution of the liquid-like material in the running passage, and lower the temperature of the liquid-like material that flows onto a surface of a workpiece.

The invention further provides a feeding module including a runner and a gate structure. The runner is adapted to be filled with a liquid-like material. The gate structure includes a storage cavity, a running passage, and a filling cavity. The storage cavity communicates with the runner and is adapted to store the liquid-like material filled by the runner. The running passage communicates with the storage cavity, and is adapted to carry the liquid-like material from the storage cavity so as to evenly distribute the liquid-like material. The filling cavity communicates with the running passage and has a buffer angle with an arc surface. The buffer angle is adapted to slow down the filling velocity of the liquid-like material, and lower the temperature of the liquid-like material flowed on the surface of the workpiece.

The invention further provides a feeding module including a runner and a gate structure. The runner is adapted to be filled with a liquid-like material. The gate structure includes a storage cavity, a running passage, and a filling cavity. The storage cavity communicates with the runner and is adapted to store the liquid-like material filled by the runner. The running passage communicates with the storage cavity, and is adapted to carry the liquid-like material from the storage cavity so as to evenly distribute the liquid-like material. The filling cavity communicates with the running passage and a width of a cross section of the filling cavity away from a side of the storage cavity gradually decreases from a center of the cross section to the two ends of the cross section. This way the filling cavity can slow down the filling velocity of the liquid-like material, and lower the temperature of the liquid-like material flowed on the surface of the workpiece.

Based on the above, the invention uses a running passage having a protruding buffering cavity, and a filling cavity having a buffer angle with an arc surface or a filling cavity having a cross section with a gradually changing width. This way, velocity of the liquid-like material can be slowed down so that flow of the liquid-like material is uniform, and at the same time the temperature of liquid-like material flowed onto a surface of a workpiece is lowered. As a result, a high gloss of the surface is achieved, without the effects of bonding wires or floating fibers, so that after the workpiece is formed it has a better appearance.

In order to make the aforementioned and other features and advantages of the invention more comprehensible, embodiments accompanying figures are described in detail below.

DESCRIPTION OF EMBODIMENTS

First Embodiment

Figure 1A:
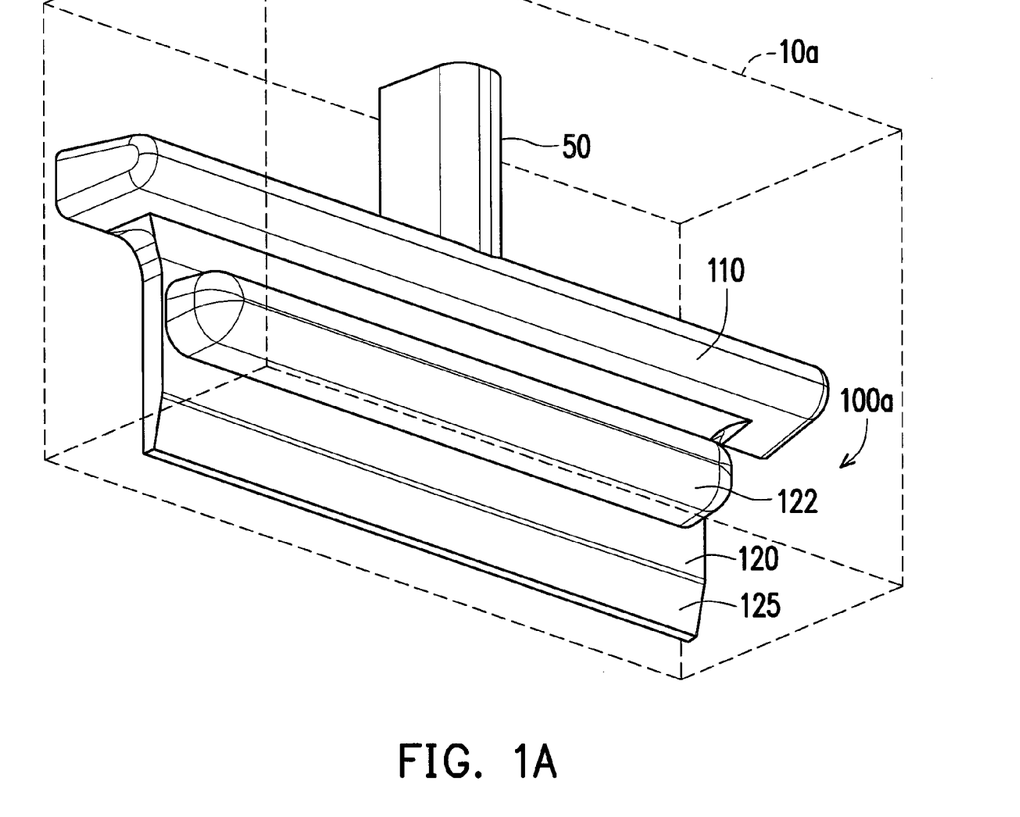
FIG. 1A is a three-dimensional view of a feeding mold according to a first embodiment of the invention.
Figure 1B:
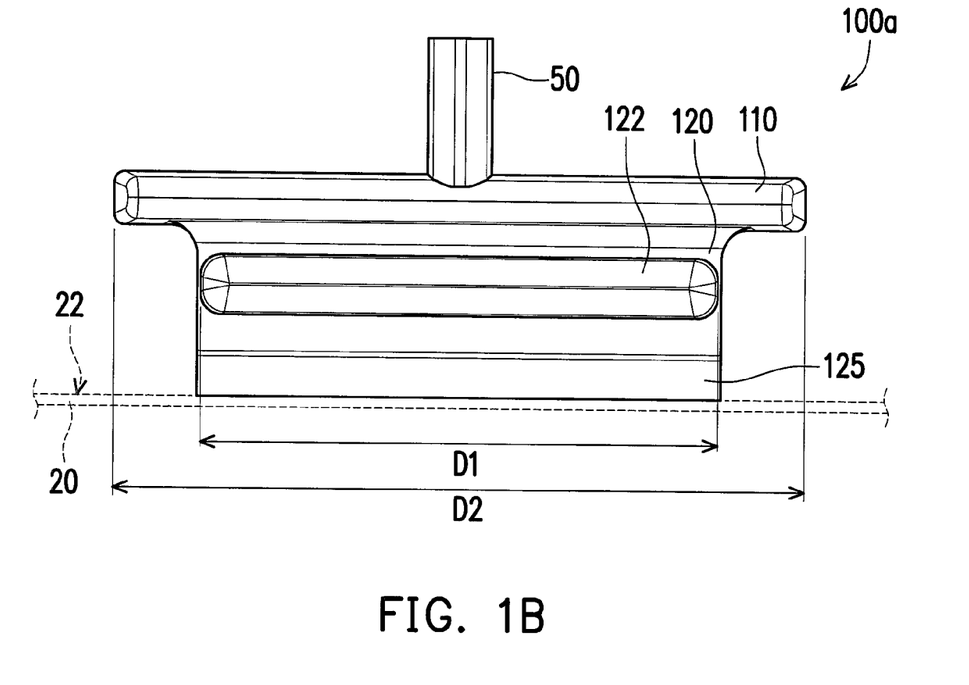
FIG. 1B is a front view of the feeding mold depicted in FIG. 1A.
Figure 1C:
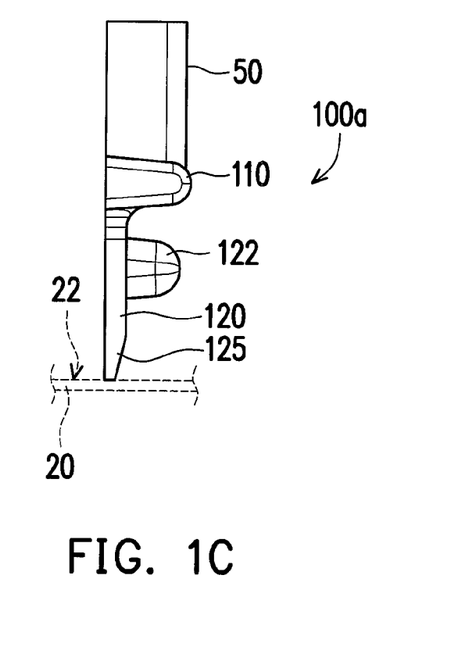
FIG. 1C is a side view of the feeding mold depicted in FIG. 1A.

FIG. 1A is a three-dimensional view of a feeding mold according to a first embodiment of the invention. FIG. 1B is a front view of the feeding mold depicted in FIG. 1A. FIG. 1B is a side view of the feeding mold depicted in FIG. 1A. Referring to FIG. 1A to FIG. 1C, in the embodiment, the feeding mold 10a is adapted for a mold for injection molding (not shown), and more particularly applied in a mold for injection molding (not shown) of an IMR. The feeding mold 10a and a cavity (not shown) of a workpiece 20 are connected, and the feeding mold 10a includes a runner 50 and a gate structure 100a. When a liquid-like material, such as melted plastic, is injected from a nozzle (not shown) of an injection molding machine (not shown), the liquid-like material is filled in the runner 50 and passes through the gate structure 100a. The liquid-like material is filled in the cavity (not shown) through the gate structure 100a. Next, after the liquid-like material has cooled, the liquid-like material remaining in the runner 50 and the gate structure 100a form a feeding mold structure (not shown). The liquid-like material located in the cavity forms the workpiece 20. It should be noted that in order for the drawings to be clearer, FIG. 1A has omitted showing the workpiece 20. FIG. 1B and FIG. 1C have omitted portions of the lines of the feeding mold 10a.

Next, after the liquid-like material has cooled and been knocked out, the feeding mold structure and the workpiece 20 are fabricated at the same time, and the feeding mold structure is connected to a surface 22 of the workpiece 20. Next, the feeding mold structure is separated from the workpiece 20, so as to complete the production of the workpiece 20. The workpiece 20 of the embodiment is formed from the liquid-like material and the IMR film, so as to decorate an outer appearance of the workpiece 20, and improve the aesthetics of the product.

The gate structure 100a includes a storage cavity 110, a running passage 120, and a filling cavity 125. The storage cavity 110 communicates with the runner 50 and is stripe shaped, and the storage cavity 110 is adapted to store the liquid-like material filled by the runner 50. The running passage 120 communicates with the storage cavity 110 and is sheet shaped. The running passage 120 is adapted to carry the liquid-like material from the storage cavity 110 so as to evenly distribute the liquid-like material. The running passage 120 has a protruding buffering cavity 122 located between the storage cavity 110 and the filling cavity 125. The buffering cavity 122 is adapted to change the velocity of the liquid-like material in the running passage 120. In detail, when the liquid-like material enters the gate structure 100a through the runner 50, the liquid-like material first flows into the storage cavity 110, so as to buffer the flow velocity of the liquid-like material. In addition, since the storage cavity 110 has a stripe shaped structure, thus the liquid-like material will be evenly distributed.

Next, the liquid-like material continues to flow in the storage cavity 110, and fills the space in the storage cavity 110. Then the liquid-like material flows into the running passage 120. Since a surface of the running passage 120 includes an additional buffering cavity, thus a thickness of the running passage 120 is increased. Accordingly, a flow velocity of the liquid-like material is again reduced. Next, the liquid-like material fills the space of the buffering cavity 122 and the space of the running passage 120. After flowing in the filling cavity 125, the liquid-like material starts to enter the cavity, gradually filling in the filling cavity 125 and gradually forming the workpiece 20. Finally, after the liquid-like material completely fills the cavity, the feeding mold structure and the workpiece 20 are complete. Accordingly, the feeding mold 10a includes multiple features for reducing velocity, so that the velocity of when the liquid-like material is injected is reduced for the liquid-like material to have a stable flow. As such, displacement of the film due to high velocity is prevented, so that the appearance of the workpiece 20 does not include any defects. In addition, since the velocity of the liquid-like material is reduced, the shearing heat produced from the friction between the liquid-like material and the mold wall is reduced, and the shear rate that flows to the filling cavity of workpiece is also reduced. Accordingly, the heat of the liquid-like material flowed onto the surface of the workpiece is reduced, so as to achieve a high gloss, without the effects of bonding wires or floating fibers. This way, after the workpiece is formed, it will have a better outer appearance. In other words, heat transmitted to the film is reduced, so as to prevent melting of the film. Thus, after the workpiece 20 is formed it will have a better appearance.

In addition, the buffering cavity 122 of the embodiment extends in a direction D1 parallel to an extension direction D2 of the storage cavity 110. Thus, the volumetric rate of the liquid-like material in the feeding mold 10a is increased, so as to assist in reducing the velocity of the liquid-like material.

Furthermore, the following conditions also help in reducing the velocity of the liquid-like material. In detail, the buffering cavity 122 of the embodiment has a length larger than half the length of the filling cavity 125. When the liquid-like material flows into the filling cavity 125 through the running passage 120, since the length of the buffering cavity 122 is similar to the length of the filling cavity 125, the volumetric rate of the liquid-like material in the feeding mold 10a is increased, so as to reduce the flow velocity of the liquid-like material. In addition, the thickness of the protrusion of the buffering cavity 122 is less than the thickness of the protrusion of the storage cavity 110, so as to reduce the flow velocity of the liquid-like material.

Second Embodiment

Figure 2A:
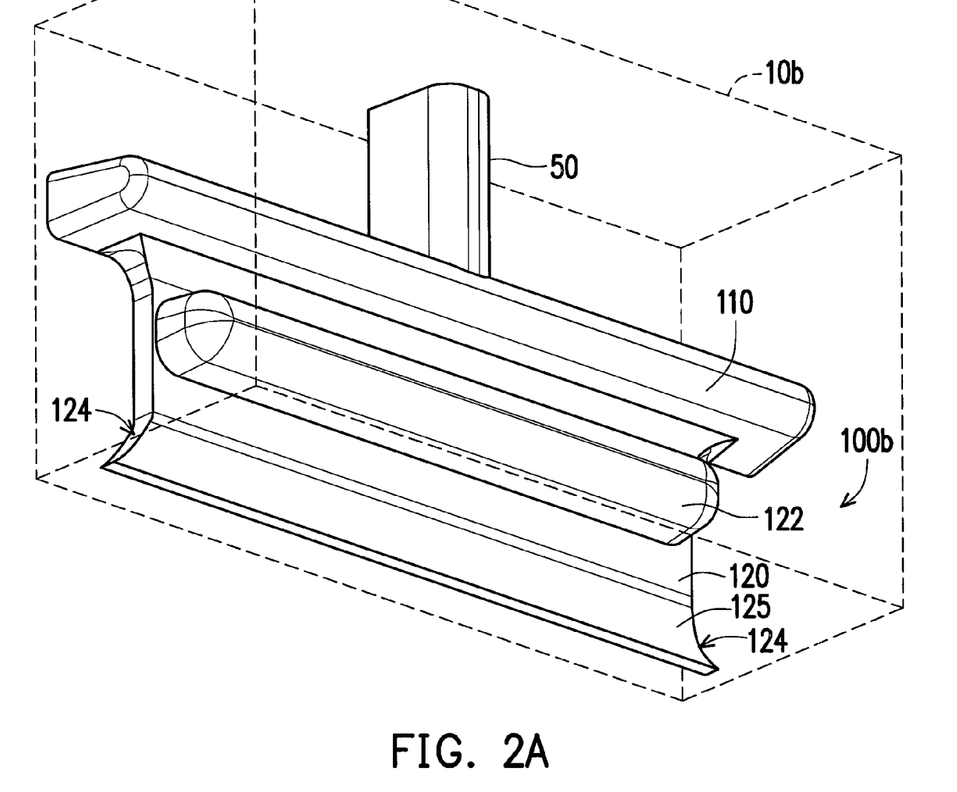
FIG. 2A is a three-dimensional view of a feeding mold according to a second embodiment of the invention.
Figure 2B:
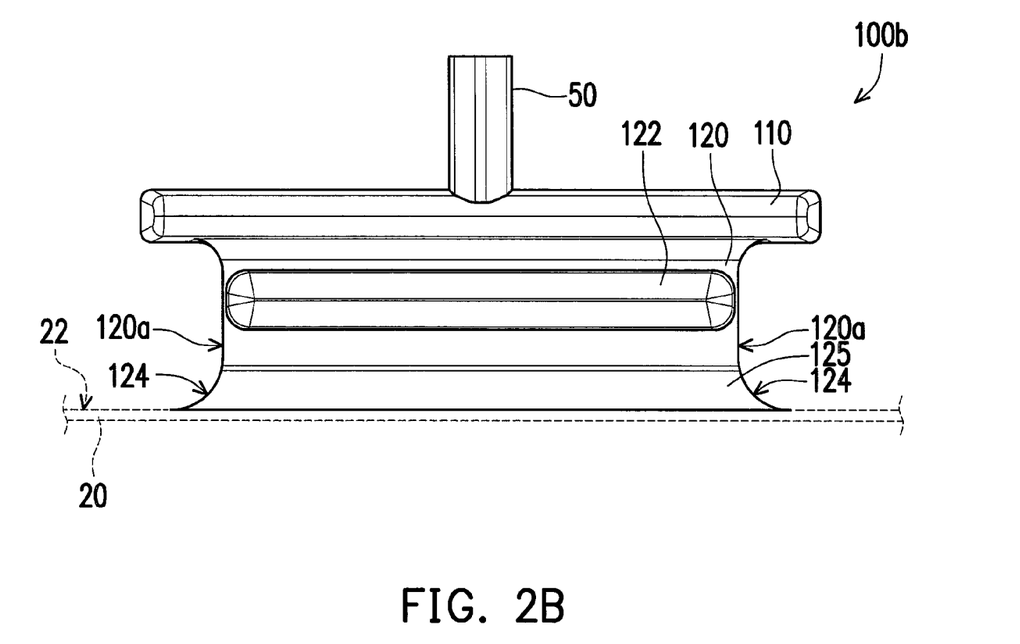
FIG. 2B is a front view of the feeding mold depicted in FIG. 2A.
Figure 2C:
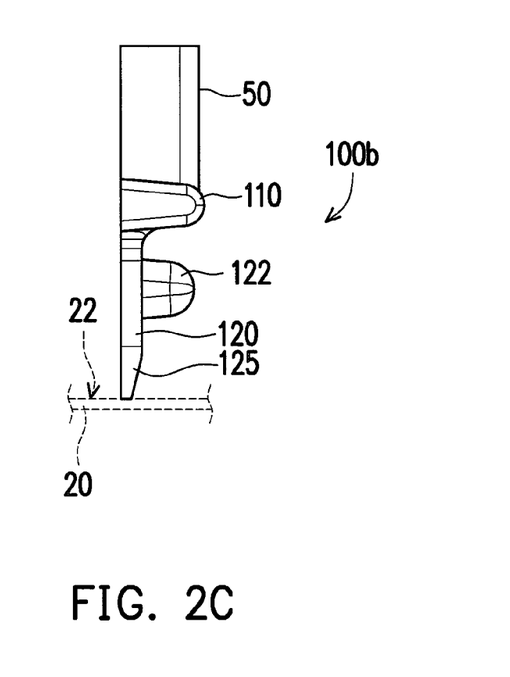
FIG. 2C is a side view of the feeding mold depicted in FIG. 2A.

FIG. 2A is a three-dimensional view of a feeding mold according to a second embodiment of the invention. FIG. 2B is a front view of the feeding mold depicted in FIG. 2A. FIG. 2C is a side view of the feeding mold depicted in FIG. 2A. Referring to FIG. 2A to FIG. 2C, in the embodiment, the feeding mold 10b is similar to the feeding mold 10a of the first embodiment. Herein, only the differences between the two will be described, wherein the same or similar elements are indicated by the same or similar reference numbers. The descriptions thereof are therefore not repeated.

The filling cavity 125 of the gate structure 100b of the embodiment communicates with the running passage 120, and includes buffer angles 124 with two arc surfaces. The buffer angles 124 are respectively connected to two sides 120a of the running passage 120, and the two sides of the cavity of the workpiece 20. When the liquid-like material is about to enter the cavity, the two buffer angles can increase the flow space of the liquid-like material flowing into the filling cavity 125, so as to reduce the velocity and pressure of the liquid-like material, and reduce the temperature of the liquid-like material flowed onto the surface of the workpiece 20. This allows the workpiece to have a better outer appearance. In addition, when compared to the first embodiment, the filling cavity 125 of the gate structure 100b of the embodiment includes additional arc guides with two buffer angles 124. This way, by way of the arc guides, the diffusivity of the liquid-like material is increased so as to quickly fill the cavity. Thus, the time for forming the workpiece 20 is reduced.

Third Embodiment

Figure 3A:
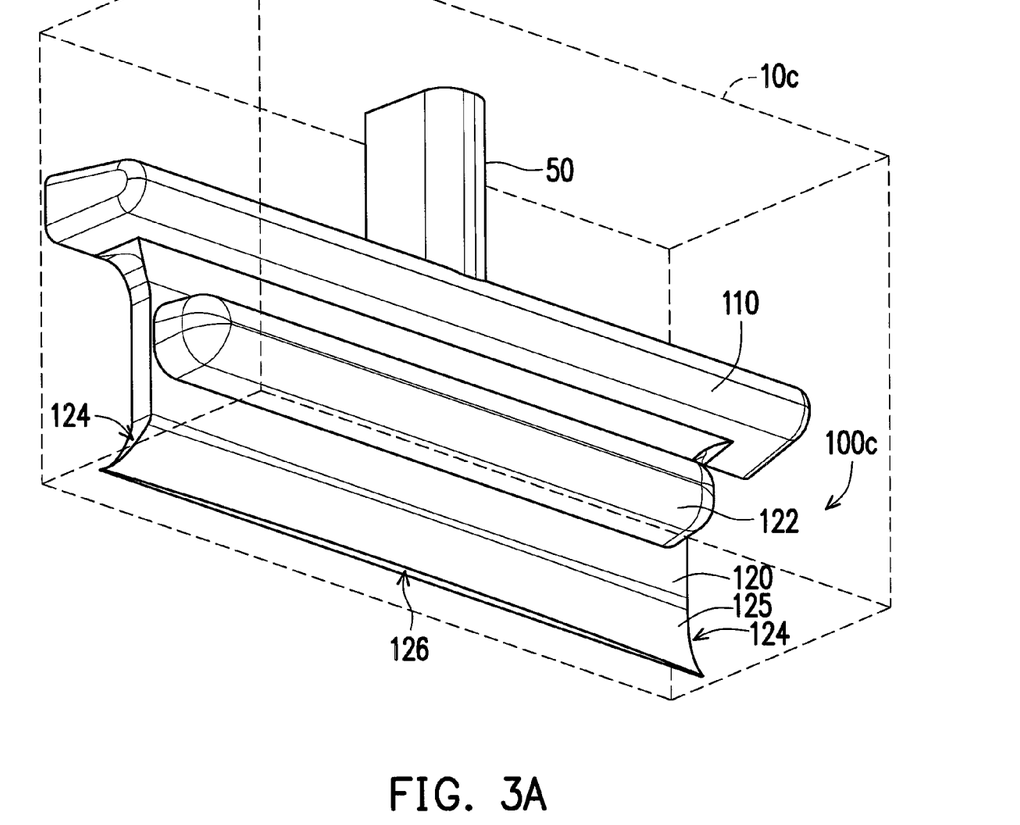
FIG. 3A is a three-dimensional view of a feeding mold according to a third embodiment of the invention.
Figure 3B:
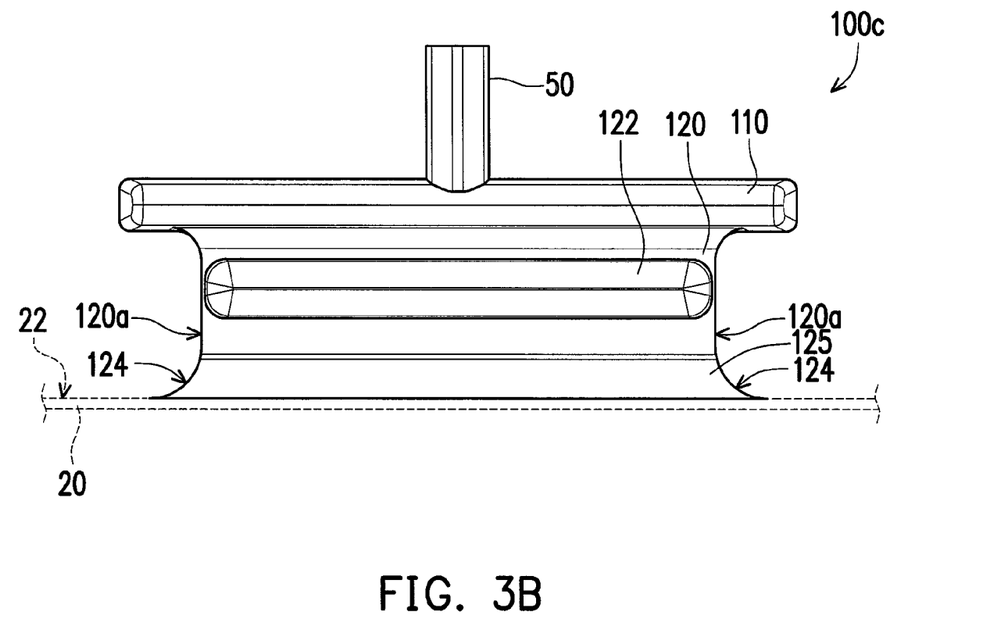
FIG. 3B is a front view of the feeding mold depicted in FIG. 3A.
Figure 3C:
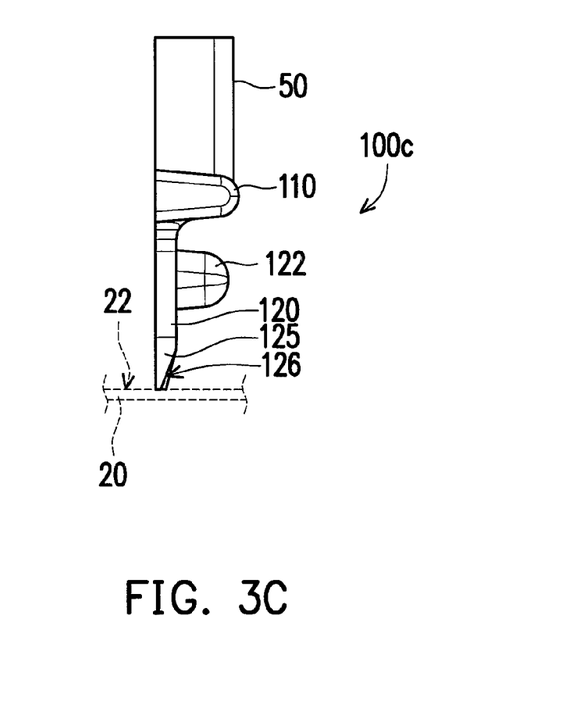
FIG. 3C is a side view of the feeding mold depicted in FIG. 3A.

FIG. 3A is a three-dimensional view of a feeding mold according to a third embodiment of the invention. FIG. 3B is a front view of the feeding mold depicted in FIG. 3A. FIG. 3C is a side view of the feeding mold depicted in FIG. 3A. Referring to FIG. 3A to FIG. 3C, in the embodiment, the feeding mold 10c is similar to the feeding mold 10b of the second embodiment. Herein, only the differences between the two will be described, wherein the same or similar elements are indicated by the same or similar reference numbers. The descriptions thereof are therefore not repeated.

In the filling cavity 125 of the gate structure 100c of the embodiment, a width of a cross section 126 of the filling cavity 125 away from a side of the storage cavity 110 gradually decreases from a center of the cross section 126 to the two ends of the cross section 126. Thus, when the liquid-like material flows into the filling cavity 125 and is about to flow into the cavity, the velocity of the liquid-like material is reduced through the width of the cross section gradually decreasing. When compared to a design of a cross section 126 of a filling cavity 125 with the same width, the embodiment can reduce the shearing heat produced by the friction between the liquid-like material and the mold surface, reduce the shear rate that flows to the filling cavity of workpiece, and lower the temperature of the liquid-like material flowed on the surface of the workpiece. This allows the quality of the outer appearance of the workpiece 20 to be maintained after it is formed.

Fourth Embodiment

Figure 4A:
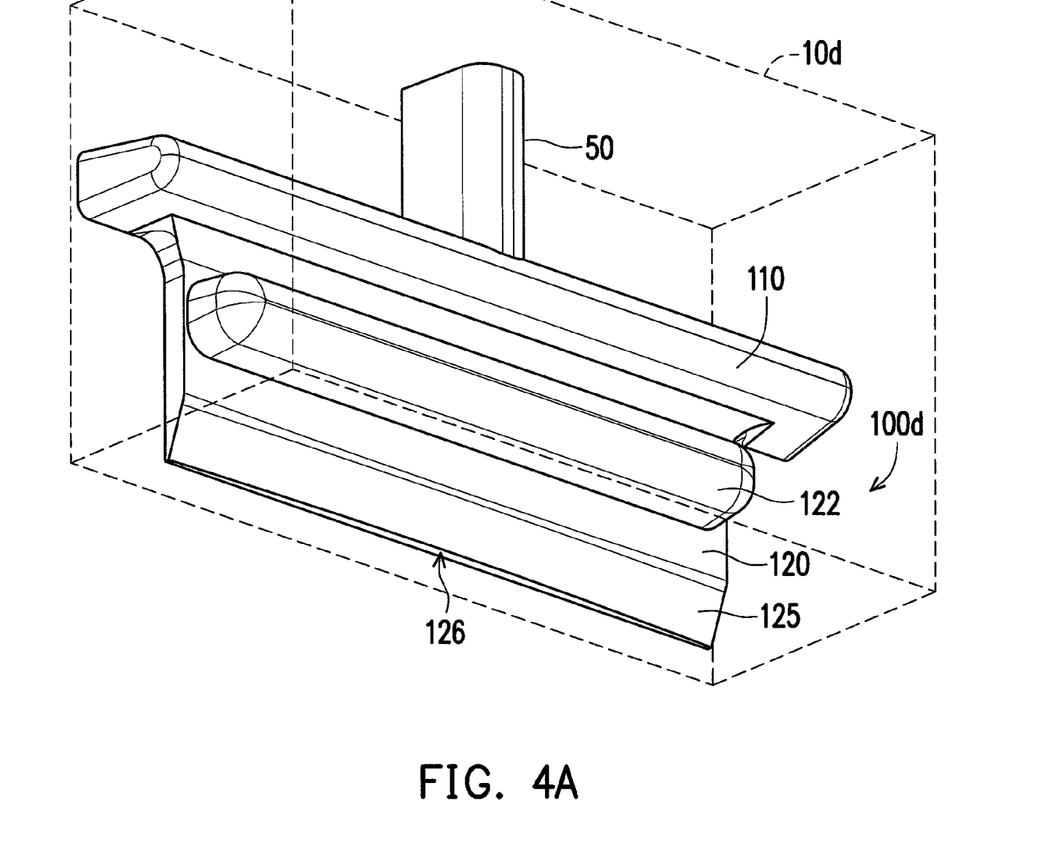
FIG. 4A is a three-dimensional view of a feeding mold according to a fourth embodiment of the invention.
Figure 4B:
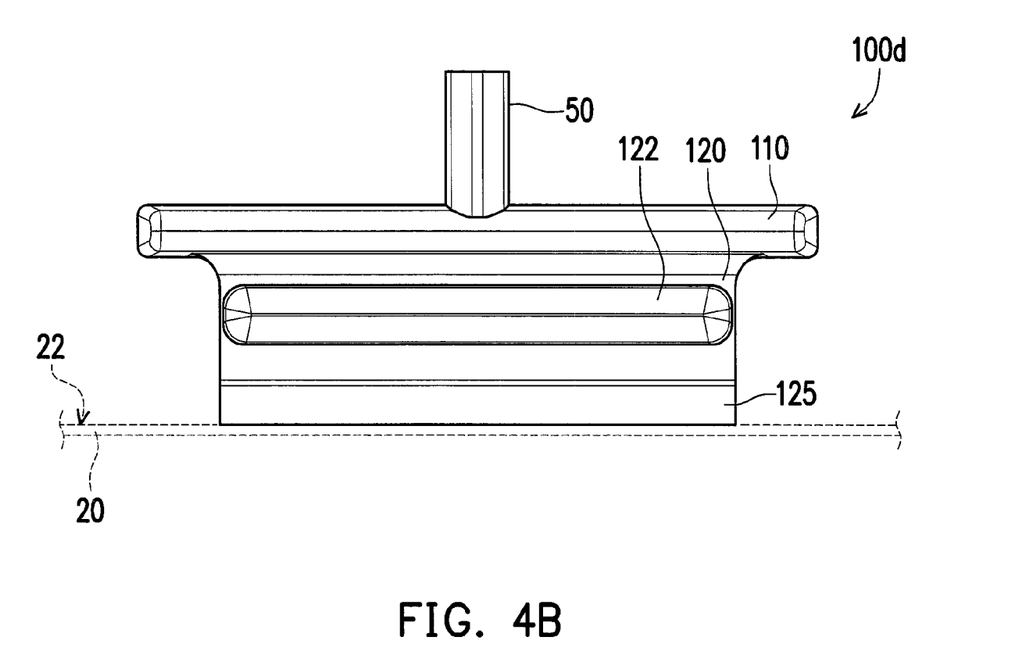
FIG. 4B is a front view of the feeding mold depicted in FIG. 4A.
Figure 4C:
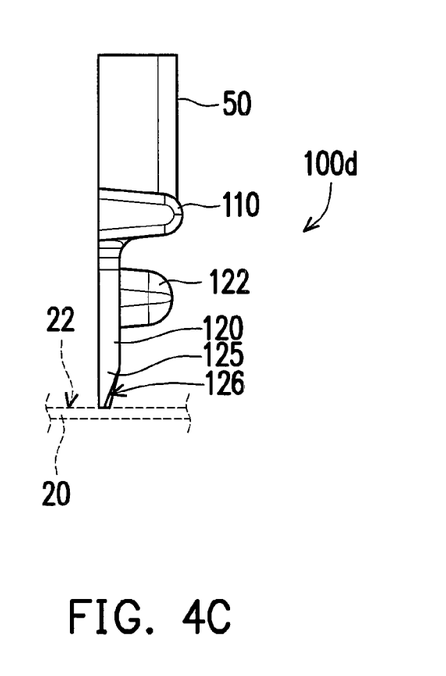
FIG. 4C is a side view of the feeding mold depicted in FIG. 4A.

FIG. 4A is a three-dimensional view of a feeding mold according to a fourth embodiment of the invention. FIG. 4B is a front view of the feeding mold depicted in FIG. 4A. FIG. 4C is a side view of the feeding mold depicted in FIG. 4A. Referring to FIG. 4A to FIG. 4C, in the embodiment, the feeding mold 10d is similar to the feeding mold 10a of the first embodiment. Herein, only the differences between the two will be described, wherein the same or similar elements are indicated by the same or similar reference numbers. The descriptions thereof are therefore not repeated.

The difference between the feeding mold 10d of the embodiment and the feeding mold 10a of the first embodiment is the following. In the filling cavity 125 of the gate structure 100d, a width of a cross section 126 of the filling cavity 125 away from a side of the storage cavity 110 gradually decreases from a center of the cross section 126 to the two ends of the cross section 126. Thus, when the liquid-like material flows into the filling cavity 125 and is about to flow into the cavity, the velocity of the liquid-like material is reduced through the width of the cross section gradually decreasing. When compared to a design of a cross section 126 of a filling cavity 125 with the same width, the embodiment can reduce velocity of the liquid-like material and the shearing heat produced by the friction between the liquid-like material and the mold surface, and reduce the shear rate that flows to the filling cavity of workpiece.

Fifth Embodiment

Figure 5A:
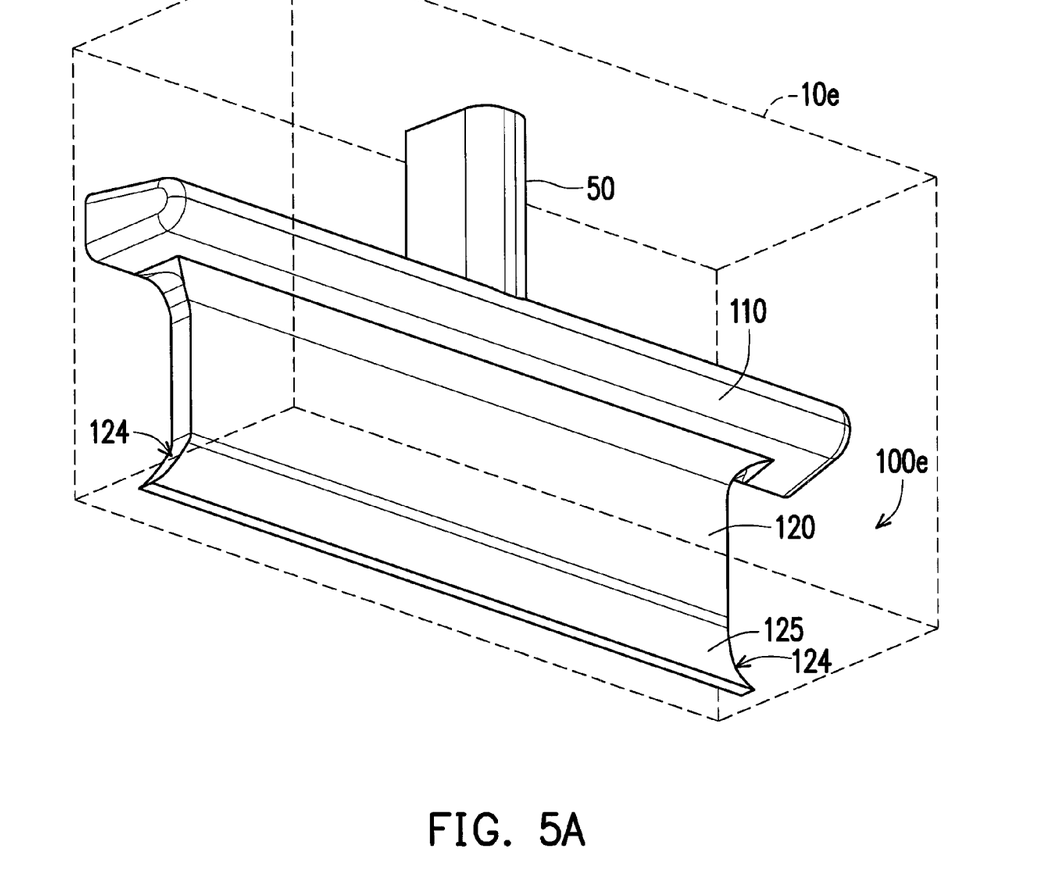
FIG. 5A is a three-dimensional view of a feeding mold according to a fifth embodiment of the invention.
Figure 5B:
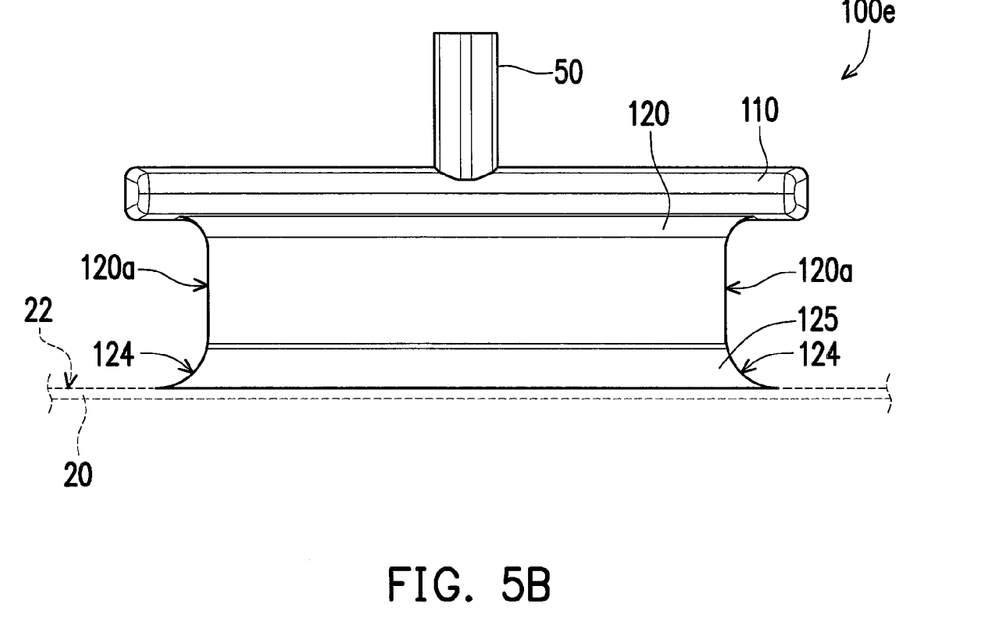
FIG. 5B is a front view of the feeding mold depicted in FIG. 5A.
Figure 5C:
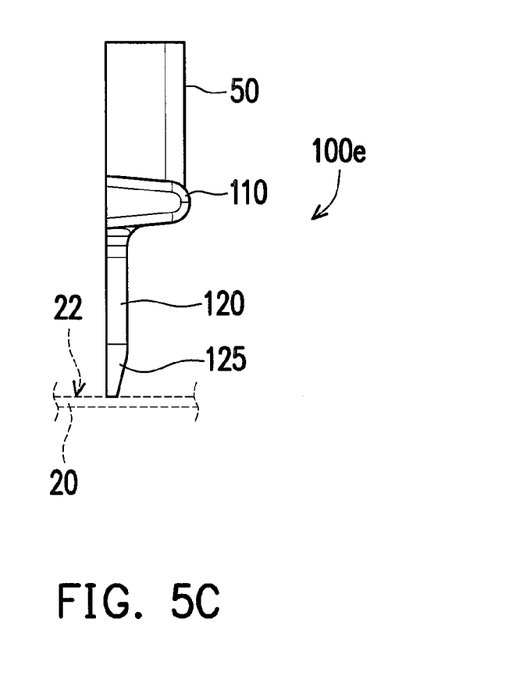
FIG. 5C is a side view of the feeding mold depicted in FIG. 5A.

FIG. 5A is a three-dimensional view of a feeding mold according to a fifth embodiment of the invention. FIG. 5B is a front view of the gate structure depicted in FIG. 5A. FIG. 5C is a side view of the feeding mold depicted in FIG. 5A. Referring to FIG. 5A to FIG. 5C, in the embodiment, the feeding mold 10e is similar to the feeding mold 10b of the second embodiment. Herein, only the differences between the two will be described, wherein the same or similar elements are indicated by the same or similar reference numbers. The descriptions thereof are therefore not repeated. The difference in the embodiments is that the running passage 120 of the gate structure 100e of the embodiment does not include a buffering cavity 122.

Figure 6A:
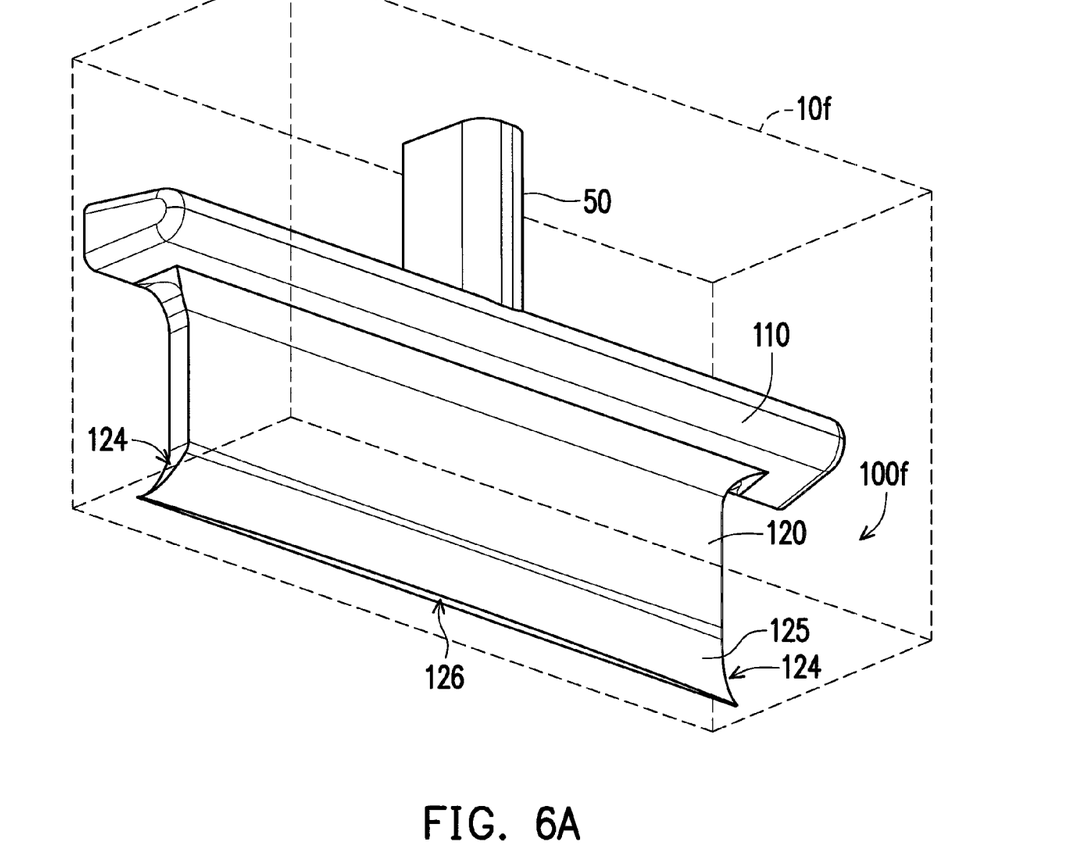
FIG. 6A is a three-dimensional view of a feeding mold according to a sixth embodiment of the invention.
Figure 6B:
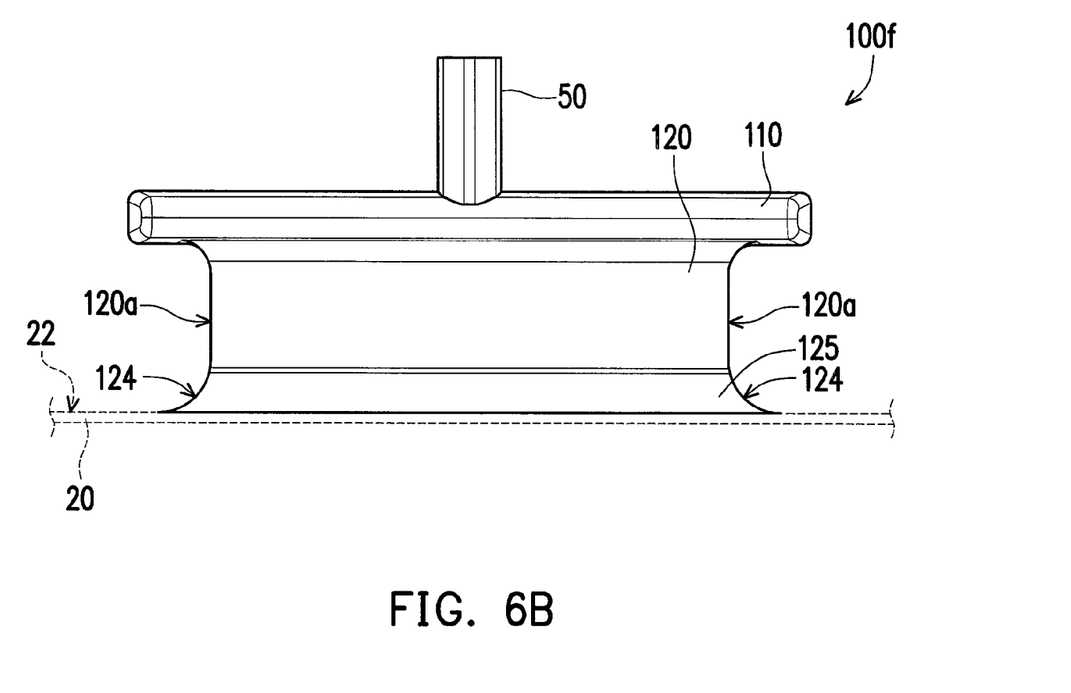
FIG. 6B is a front view of the feeding mold depicted in FIG. 6A.
Figure 6C:
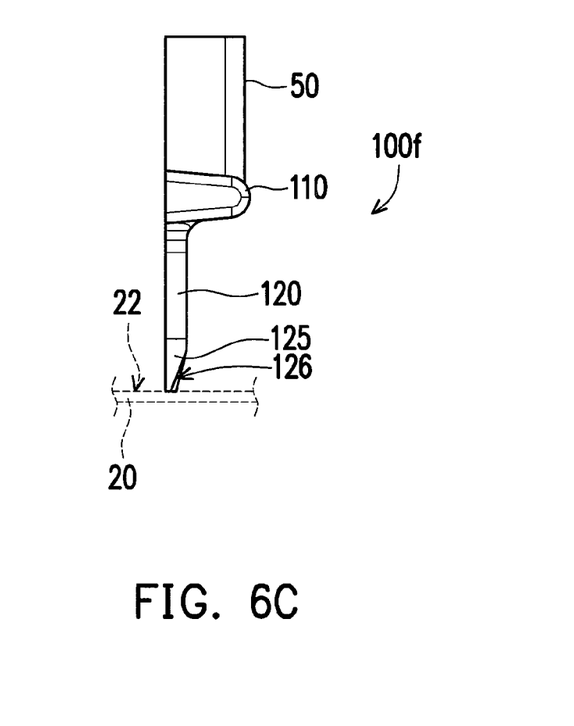
FIG. 6C is a side view of the feeding mold depicted in FIG. 6A.

In detail, the storage cavity 110 of the embodiment communicates with the runner 50 and is stripe shaped, and the storage cavity 110 is adapted to store the liquid-like material filled by the runner 50. The running passage 120 communicates with the storage cavity 110 and is sheet shaped. The running passage 120 is adapted to carry the liquid-like material from the storage cavity 110 so as to evenly distribute the liquid-like material. The filling cavity 125 includes buffer angles 124. The buffer angles 124 are respectively connected to two sides 120a of the running passage 120, and the two sides of the cavity of the workpiece 20. The buffer angles 124 reduce the velocity and pressure of the liquid-like material, so that after the workpiece 20 is formed it will have a better appearance. In addition, the surface can increase the diffusivity of the liquid-like material so as to quickly fill the cavity. Thus, the time for forming the workpiece 20 is reduced Sixth Embodiment FIG. 6A is a three-dimensional view of a feeding mold according to a sixth embodiment of the invention. FIG. 6B is a front view of the feeding mold depicted in FIG. 6A. FIG. 6C is a side view of the feeding mold depicted in FIG. 6A. Referring to FIG. 6A to FIG. 6C, in the embodiment, the feeding mold 10f is similar to the feeding mold 10e of the fifth embodiment. Herein, only the differences between the two will be described, wherein the same or similar elements are indicated by the same or similar reference numbers. The descriptions thereof are therefore not repeated.

In the filling cavity 125 of the gate structure 100f of the embodiment, a width of a cross section 126 of the filling cavity 125 away from a side of the storage cavity 110 gradually decreases from a center of the cross section 126 to the two ends of the cross section 126. Thus, when the liquid-like material flows into the filling cavity 125 and is about to flow into the cavity, the velocity of the liquid-like material is reduced through the width of the cross section gradually decreasing. Thus, the shearing heat produced by the friction between the liquid-like material and the mold surface is reduced, and the shear rate that flows to the filling cavity of workpiece is also reduced. This allows the quality of the outer appearance of the workpiece 20 to be maintained after it is formed.

Seventh Embodiment

Figure 7A:
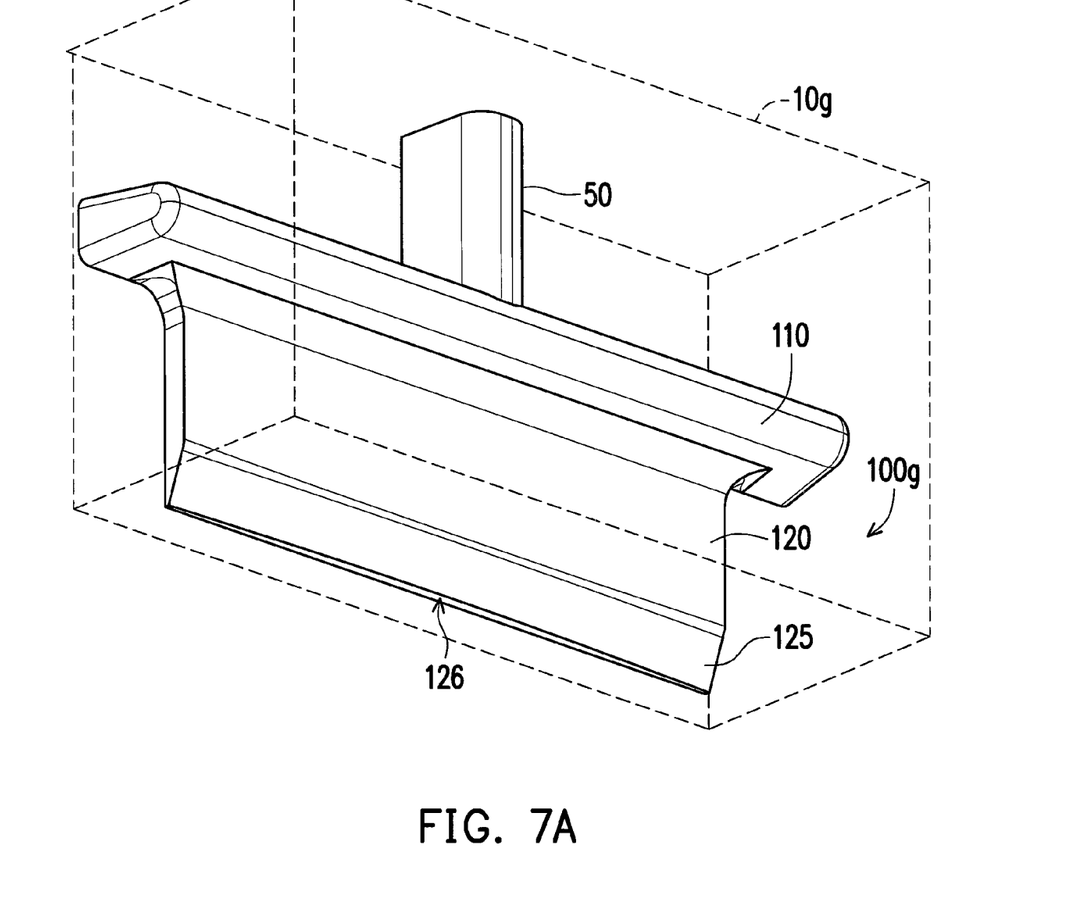
FIG. 7A is a three-dimensional view of a feeding mold according to a seventh embodiment of the invention.
Figure 7B:
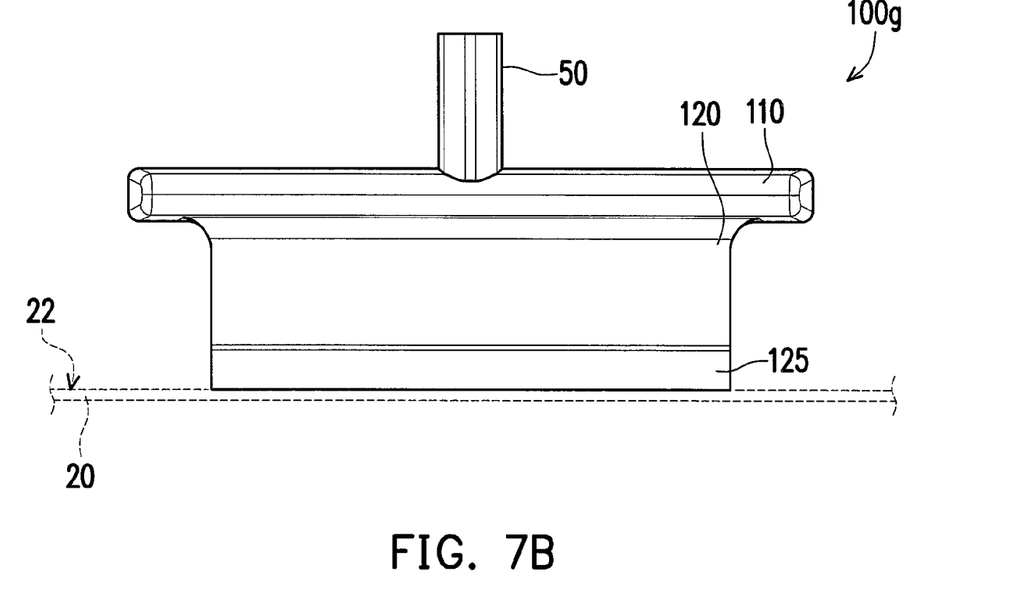
FIG. 7B is a front view of the feeding mold depicted in FIG. 7A.
Figure 7C:
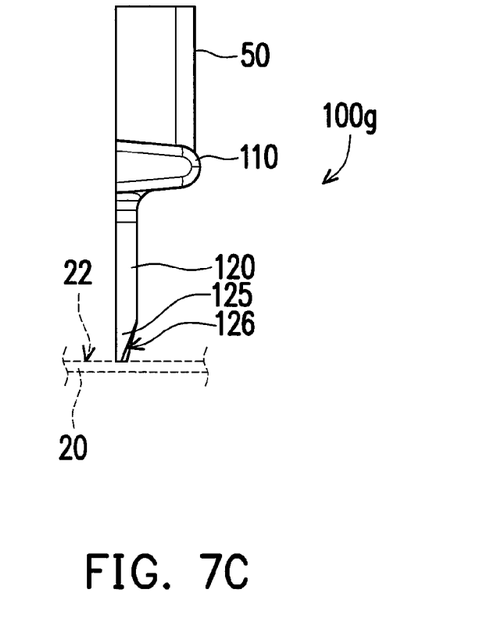
FIG. 7C is a side view of the feeding mold depicted in FIG. 7A.

FIG. 7A is a three-dimensional view of a feeding mold according to a seventh embodiment of the invention. FIG. 7B is a front view of the feeding mold depicted in FIG. 7A. FIG. 7C is a side view of the feeding mold depicted in FIG. 7A. Referring to FIG. 7A to FIG. 7C, in the embodiment, the feeding mold 10g is similar to the feeding mold 10d of the fourth embodiment. Herein, only the differences between the two will be described, wherein the same or similar elements are indicated by the same or similar reference numbers. The descriptions thereof are therefore not repeated. The difference in the embodiments is that the running passage 120 of the embodiment does not include a buffering cavity 122.

In detail, the storage cavity 110 of the embodiment communicates with the runner 50 and is stripe shaped, and the storage cavity 110 is adapted to store the liquid-like material filled by the runner 50. The running passage 120 communicates with the storage cavity and is sheet shaped. The running passage 120 is adapted to carry the liquid-like material from the storage cavity 110 so as to evenly distribute the liquid-like material. In the filling cavity 125 of the gate structure 100g, a width of a cross section 126 of the filling cavity 125 away from a side of the storage cavity 110 gradually decreases from a center of the cross section 126 to the two ends of the cross section 126. Thus, when the liquid-like material is about to flow into the cavity, the velocity of the liquid-like material is reduced through the width of the cross section gradually decreasing. Thus, the shearing heat produced by the friction between the liquid-like material and the mold surface is reduced, and the shear rate that flows to the filling cavity of workpiece is also reduced. This allows the quality of the outer appearance of the workpiece 20 to be maintained after it is formed.

To sum up, the running passage of the invention includes a storage cavity with a protrusion, a filling cavity having buffer angles with an arc surface or a filling cavity having a cross section with a gradually changing width. Thus, the velocity when injecting the liquid-like material, such as melted plastic, can be slowed down so that the shearing heat produced by the friction between the liquid-like material and the mold surface is reduced, and the shear rate that flows to the filling cavity of workpiece is also reduced. Accordingly, the heat of the liquid-like material flowed onto the surface of the workpiece is reduced, so as to achieve a high gloss, without the effects of bonding wires or floating fibers. This way, after the workpiece is formed, it will have a better outer appearance. In addition, when the buffering cavity extends in a direction parallel to an extension direction of the storage cavity, the volumetric rate of the liquid-like material in the gate is increased, so as to assist in reducing the velocity of the liquid-like material.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A feeding mold, comprising:
   a runner adapted to be filled with a liquid material; and
   a gate structure, comprising:
      a storage cavity communicating with the runner and adapted to store the liquid material filled by the runner;
      a running passage communicating with the storage cavity, and adapted to carry the liquid material from the storage cavity so as to evenly distribute the liquid material, wherein the running passage has a protruding buffering cavity, adapted to change the velocity of the liquid material in the running passage; and
      a filling cavity, wherein the buffering cavity is located between the storage cavity and the filling cavity.

2. The feeding mold as claimed in claim 1, wherein an extension direction of the buffering cavity is parallel to an extension direction of the storage cavity.

3. The feeding mold as claimed in claim 1, wherein a thickness of a protrusion of the buffering cavity is less than a thickness of a protrusion of the storage cavity.

4. The feeding mold as claimed in claim 1, wherein a length of the buffering cavity is larger than half a length of the filling cavity.

5. The feeding mold as claimed in claim 1, wherein the filling cavity includes a buffer angle with an arc surface, adapted to reduce a filling velocity of the liquid material.

6. The feeding mold as claimed in claim 5, wherein a width of a cross section of the filling cavity away from a side of the storage cavity gradually decreases from a center of the cross section to two ends of the cross section.

7. The feeding mold as claimed in claim 1, wherein a width of a cross section of the filling cavity away from a side of the storage cavity gradually decreases from a center of the cross section to two ends of the cross section.

8. The feeding mold as claimed in claim 1, wherein a material of the liquid material comprises a material selected from a group consisting of glass fiber, plastic, resin, and carbon fiber.

9. A feeding mold, comprising:
   a runner adapted to be filled with a liquid material; and
   a gate structure, comprising:
      a storage cavity communicating with the runner and adapted to store the liquid material filled by the runner;
      a running passage communicating with the storage cavity, and adapted to carry the liquid material from the storage cavity so as to evenly distribute the liquid material; and
      a filling cavity having a buffer angle with an arc surface, wherein the buffer angle is adapted to reduce a filling velocity of the liquid material.

10. The feeding mold as claimed in claim 9, wherein a width of a cross section of the filling cavity away from a side of the storage cavity gradually decreases from a center of the cross section to two ends of the cross section.

11. The feeding mold as claimed in claim 9, wherein a material of the liquid material comprises a material selected from a group consisting of glass fiber, plastic, resin, and carbon fiber.

12. A feeding mold, comprising:
   a runner adapted to be filled with a liquid material; and
   a gate structure, comprising:

a storage cavity communicating with the runner and adapted to store the liquid material filled by the runner;

a running passage communicating with the storage cavity, and adapted to carry the liquid material from the storage cavity so as to evenly distribute the liquid material; and a filling cavity, wherein a width of a cross section of the filling cavity away from a side of the storage cavity gradually decreases from a center of the cross section to two ends of the cross section.

13. The feeding mold as claimed in claim 12, wherein a material of the liquid material comprises a material selected from a group consisting of glass fiber, plastic, resin, and carbon fiber.

* * * * *